E. LISSAUER.
SIGNALING APPARATUS.
APPLICATION FILED SEPT. 10, 1912.
1,091,938.
Patented Mar. 31, 1914.
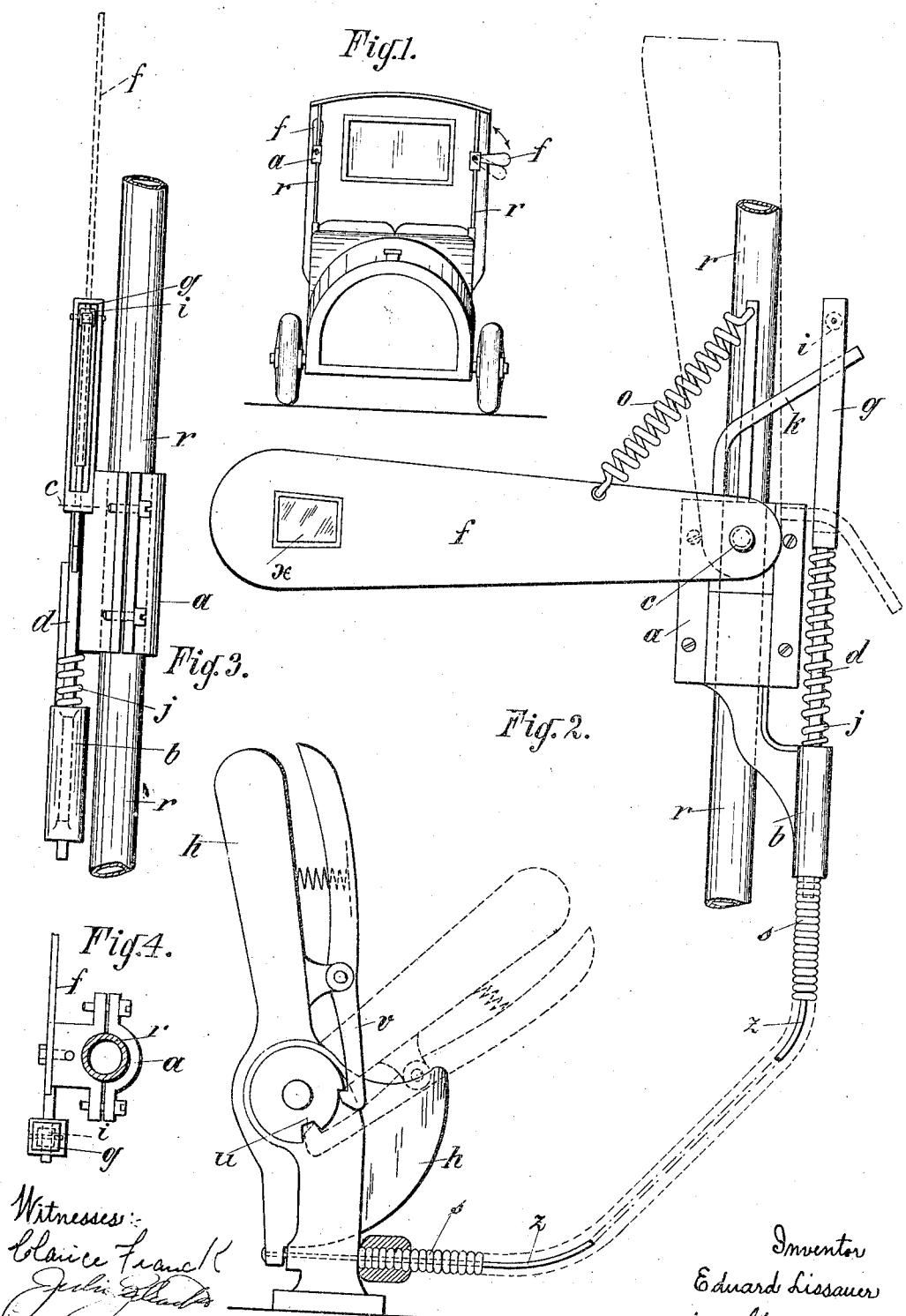

UNITED STATES PATENT OFFICE.

EDUARD LISSAUER, OF CHARLOTTENBURG, GERMANY.

SIGNALING APPARATUS.

1,091,938.

Specification of Letters Patent.

Patented Mar. 31, 1914.

Application filed September 10, 1912. Serial No. 719,506.

*To all whom it may concern:*

Be it known that I, EDUARD LISSAUER, subject of the German Emperor, residing at 167/168 Uhlandstrasse, Charlottenburg, Germany, have invented certain new and useful Improvements in Signaling Apparatus, of which the following is a specification.

This invention relates to an apparatus for indicating the direction in which a vehicle is about to turn.

It has for its object to serve as safety means in street traffic in enabling the driver of the vehicle to give a signal, whereby the direction in which the vehicle is about to turn can be made known or signalized to the drivers of the vehicles behind or in front in order to prevent a collision of the vehicles.

In connection with the apparatus, the movement of the signaling arm is effected in the known manner in that locking means are released, whereupon the signaling arm assumes the signaling position under the action of its own weight, a spring or the like.

According to the invention, the signaling arm is elastically buffered in such a manner that it only assumes its final position after it has undergone several clearly visible upward and downward swinging movements. Due attention is thus attracted to the signaling. For the purpose of attracting attention, a mirror may also be combined with the signaling arms, whereby by the reflection of light especially in the dark *i. e.* by the reflection of lamp lights, the signal can thus be rendered more effective.

Referring to the accompanying drawing, Figure 1 shows a form of construction, according to which the adjustable signaling arm $f$ is provided on the left and right side of an automobile. The rods $r$ $r$, which are usually provided on the right and left of the driver's seat, constitute suitable means for enabling the apparatus to be attached on both sides, so that the signaling arms or indicating wings $f$ can be swung outwardly on the left or right in a clearly visible position and thus give a signal similarly as when the automobile driver produces with his hand on the right or left the warning signal for the vehicles behind.

The apparatus is shown in Figs. 2, 3 and 4. Fig. 2 shows the apparatus (in combination with a Bowden mechanism) provided on the left side, Fig. 3 is a side elevation and Fig. 4 a plan with respect to Fig. 2.

The signaling arm $f$ is fulcrumed at $c$ in a bracket $a$ which in the form of a two-part clip can be secured to the rod $r$ or the like (Figs. 1–4). A member $b$ attached to the bracket $a$ forms a vertical guide for a rod $d$ (Figs. 2 and 3) which being surrounded by a spiral spring $j$ extends upward and terminates in a fork $g$, at the top of which a roller $i$ is provided. The latter forms the downwardly acting engaging means for the knee-shaped lever $k$ which is secured to the signaling arm $f$ and extends through the fork $g$.

As is obvious from Fig. 2, the downward pull of the rod $d$, which takes place in opposition to the lifting tendency of the spring $j$, effects by means of the fork $g$ and roller $i$ a tilting or upward swinging of the signaling wing $f$ out of the indicating position as shown until it assumes a position of rest as shown in dotted lines, the lever $k$ being firmly held beneath the roller $i$. In this position of the parts, the apparatus assumes the position in which it is ready for being rendered operative after the releasing action.

The connection with the known Bowden mechanism is such (Fig. 2) that there is connected to the lower end of the rod $d$ the wire-shaped pulling member $z$ which is surrounded by the tubular non-compressible member $s$ and that this pulling power transmitter is connected to an adjusting lever $h$ in the known manner. When shifting the adjusting lever $h$ into the position indicated by dotted lines, the pull of the pulling member $z$ takes place to the same extent as the lift of the rod $d$. In the final or end position, a spring pawl $v$ of the adjusting lever engages in a notch $u$ of the fixed part, so that the rearward movement (under the compulsion of the spring $j$) cannot take place of its own accord. This apparatus is supposed to be provided near to the steering means of the automobile or it can be combined with the steering mechanism. It can also be operated by the foot instead of by hand.

In the case of use, it is only necessary for the driver by pressing against the pawl $v$ to effect its disengagement at $u$, whereupon the adjusting lever $h$ is immediately reversed or shifted because the spring $j$ acts on the pulling rods and the rod $d$ with fork $g$ and roller $i$ moves upward on the spring being released or relieved. The released signaling arm *f* therefore swings into a position as shown but owing to the presence of a flexible support such as a spring *o* (Fig. 2), it cannot attain its end or final position without previously performing a clearly visible rocking movement. The spring *o* is a retractile spring, which is shown in its extended position in Fig. 2. When the signaling arm is moved upwardly the spring *o* will shorten to an extent corresponding to the upward movement of the arm, so that when the arm is in substantially vertical position (dotted line position of Fig. 2) the spring will have attained its normal, compressed, state. This repeating rocking movement attracts special attention to the given signal. In order to also render the signaling conspicuous in the dark, it is advisable to provide a mirror *x* on the signaling arm (Fig. 2). By special lighting means or by the reflection of the existing lamp lights, such mirror, which may either be a plane, convex or concave mirror, is adapted to effectively attract attention to the operation of the signaling apparatus, which is attained by the rocking movement of the arm, so that the apparatus fulfils its purpose with greater safety. It is obvious that the apparatus may also be used for other signaling purposes.

Having now particularly described and ascertained the nature of my said invention and in what manner the same is to be performed, I declare that what I claim and wish to secure by Letters Patent is:—

1. Signaling apparatus embodying therein a pivotally mounted signaling arm having a lever arm attached thereto, means adapted for engagement with said lever arm to move said signaling arm into inoperative position, means whereby said signaling arm may be moved into signaling position, and means whereby said signaling arm is caused to oscillate about its pivot prior to its assuming final signaling position.

2. Signaling apparatus embodying therein a vertically extending rod, a bracket secured to said rod, a signaling arm pivotally carried by said bracket, means whereby said arm may be swung about its pivot, and a spring having one end connected to said arm and its other end connected to said rod, whereby said arm is caused to oscillate when moved into signaling position.

3. Signaling apparatus embodying therein a support, a visual signaling arm pivoted to said support, a projection carried by said arm, means engaging said projection for moving said signaling arm into inoperative position, said signaling arm being adapted to move into operative position by gravity, and a flexible elastic connection between said support and said signaling arm whereby the latter oscillates about its pivot before assuming final signaling position.

4. Signaling apparatus embodying therein a support, a visual signaling arm pivoted to said support, a curved lever arm carried by said signaling arm, an operating rod for said signaling arm carrying a roller contacting with said lever arm, and a spring connecting said signaling arm and said support.

In testimony whereof I affix my signature in presence of two witnesses.

EDUARD LISSAUER.

Witnesses:
 WOLDEMAR HAUPT,
 ARTHUR SCHROEDER.